United States Patent
Bhaya et al.

(10) Patent No.: US 10,032,452 B1
(45) Date of Patent: *Jul. 24, 2018

(54) MULTIMODAL TRANSMISSION OF PACKETIZED DATA

(71) Applicant: Google Inc., Mountain View, CA (US)

(72) Inventors: Gaurav Bhaya, Sunnyvale, CA (US); Robert Stets, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/395,703

(22) Filed: Dec. 30, 2016

(51) Int. Cl.
*G10L 15/00* (2013.01)
*G10L 21/00* (2013.01)
(Continued)

(52) U.S. Cl.
CPC .............. *G10L 15/22* (2013.01); *G10L 15/14* (2013.01); *G10L 15/1822* (2013.01);
(Continued)

(58) Field of Classification Search
CPC ..... G10L 15/02; G10L 15/005; G10L 15/063; G10L 15/222; G10L 2015/223;
(Continued)

(56) References Cited

U.S. PATENT DOCUMENTS 5,675,788 A 10/1997 Husick et al.
5,724,521 A 3/1998 Dedrick
(Continued)

FOREIGN PATENT DOCUMENTS

EP 1 271 458 1/2003
EP 1 286 288 2/2003
(Continued)

OTHER PUBLICATIONS

Best practices for creating adaptive user interfaces with the mobile Internet toolkit:, Microsoft Corporation, Jan. 2002, pp. 1-2. Downloaded Dec. 21, 2006 from http://msdn.microsoft.com/library/default.asp?url=/library/en- us/dnmitta/html/bestpractaui.asp.
(Continued)

*Primary Examiner* — Edgar Guerra-Erazo
(74) *Attorney, Agent, or Firm* — Foley & Lardner LLP; James De Vellis

(57) ABSTRACT

A system of multi-modal transmission of packetized data in a voice activated data packet based computer network environment is provided. A natural language processor component can parse an input audio signal to identify a request and a trigger keyword. Based on the input audio signal, a direct action application programming interface can generate a first action data structure, and a content selector component can select a content item. An interface management component can identify first and second candidate interfaces, and respective resource utilization values. The interface management component can select, based on the resource utilization values, the first candidate interface to present the content item. The interface management component can provide the first action data structure to the client computing device for rendering as audio output, and can transmit the content item converted for a first modality to deliver the content item for rendering from the selected interface.

20 Claims, 4 Drawing Sheets

(51) Int. Cl.
*G10L 25/00* (2013.01)
*G10L 15/22* (2006.01)
*G10L 15/18* (2013.01)
*G10L 15/14* (2006.01)
*G10L 15/30* (2013.01)
*H04L 12/825* (2013.01)
*G10L 15/08* (2006.01)

(52) U.S. Cl.
CPC ............. *G10L 15/30* (2013.01); *H04L 47/25* (2013.01); *G10L 2015/088* (2013.01)

(58) Field of Classification Search
CPC ........... G10L 2015/265; G10L 2015/30; G10L 2015/32; G10L 17/22; G10L 25/51; G10L 25/54
See application file for complete search history.

(56) References Cited

U.S. PATENT DOCUMENTS

| | | | |
|---|---|---|---|
| 5,740,549 A | 4/1998 | Reilly et al. | |
| 5,749,069 A * | 5/1998 | Komori | G10L 15/08 |
| | | | 704/240 |
| 5,848,397 A | 12/1998 | Marsh et al. | |
| 5,850,433 A | 12/1998 | Rondeau | |
| 5,948,061 A | 9/1999 | Merriman et al. | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman et al. | |
| 6,167,382 A | 12/2000 | Sparks et al. | |
| 6,189,003 B1 | 2/2001 | Leal | |
| 6,259,127 B1 | 7/2001 | Pan | |
| 6,269,361 B1 | 7/2001 | Davis et al. | |
| 6,275,806 B1 | 8/2001 | Pertrushin | |
| 6,332,127 B1 | 12/2001 | Bandera et al. | |
| 6,401,075 B1 | 6/2002 | Mason et al. | |
| 6,600,930 B1 | 7/2003 | Sakurai et al. | |
| 6,647,257 B2 | 11/2003 | Owensby | |
| 6,665,293 B2 | 12/2003 | Thornton et al. | |
| 6,677,894 B2 | 1/2004 | Sheynblat et al. | |
| 6,684,249 B1 | 1/2004 | Frerichs et al. | |
| 6,731,612 B1 | 5/2004 | Koss | |
| 6,857,007 B1 | 2/2005 | Bloomfield | |
| 6,956,816 B1 | 10/2005 | Alexander et al. | |
| 6,983,331 B1 | 1/2006 | Mitchell et al. | |
| 7,016,343 B1 | 3/2006 | Mermel et al. | |
| 7,039,599 B2 | 5/2006 | Merriman et al. | |
| 7,120,235 B2 | 10/2006 | Altberg et al. | |
| 7,136,875 B2 | 11/2006 | Anderson et al. | |
| 7,376,640 B1 | 5/2008 | Anderson et al. | |
| 7,406,434 B1 | 7/2008 | Chang et al. | |
| 7,613,637 B2 | 11/2009 | Chan et al. | |
| 7,668,950 B2 | 2/2010 | Horowitz et al. | |
| 7,853,255 B2 | 12/2010 | Karaoguz et al. | |
| 7,904,460 B2 | 3/2011 | Armour et al. | |
| 8,041,709 B2 | 10/2011 | Permandla et al. | |
| 8,068,604 B2 * | 11/2011 | Leeds | H04M 1/656 |
| | | | 379/167.08 |
| 8,108,383 B2 | 1/2012 | Lin et al. | |
| 8,195,133 B2 | 6/2012 | Ramer et al. | |
| 8,204,881 B2 | 6/2012 | Holt et al. | |
| 8,214,342 B2 | 7/2012 | Meiresonne | |
| 8,234,275 B2 | 7/2012 | Grant et al. | |
| 8,312,014 B2 | 11/2012 | Lu et al. | |
| 8,386,386 B1 | 2/2013 | Zhu | |
| 8,453,058 B1 * | 5/2013 | Coccaro | G06Q 10/103 |
| | | | 705/319 |
| 8,762,156 B2 * | 6/2014 | Chen | G10L 15/26 |
| | | | 704/10 |
| 8,903,716 B2 | 12/2014 | Chen et al. | |
| 8,988,882 B2 | 3/2015 | Ohsawa et al. | |
| 9,275,637 B1 * | 3/2016 | Salvador | G10L 15/01 |
| 9,318,107 B1 * | 4/2016 | Sharifi | G10L 15/08 |
| 9,424,841 B2 * | 8/2016 | Foerster | G10L 15/02 |
| 9,542,941 B1 * | 1/2017 | Weksler | G10L 15/22 |
| 9,653,075 B1 * | 5/2017 | Chen | H04L 12/4625 |
| 2001/0020236 A1 | 9/2001 | Cannon | |
| 2001/0025275 A1 | 9/2001 | Tanaka et al. | |
| 2002/0029226 A1 | 3/2002 | Li et al. | |
| 2002/0042829 A1 | 4/2002 | Mizuhara et al. | |
| 2002/0077130 A1 | 6/2002 | Owensby | |
| 2002/0082938 A1 | 6/2002 | Borger et al. | |
| 2002/0091571 A1 | 7/2002 | Thomas et al. | |
| 2002/0128908 A1 | 9/2002 | Levin et al. | |
| 2002/0161646 A1 | 10/2002 | Gailey et al. | |
| 2002/0164977 A1 | 11/2002 | Link, II et al. | |
| 2002/0188680 A1 | 12/2002 | McCormack et al. | |
| 2003/0008661 A1 | 1/2003 | Joyce et al. | |
| 2003/0018479 A1 * | 1/2003 | Oh | G10L 19/018 |
| | | | 704/275 |
| 2003/0028529 A1 | 2/2003 | Cheung et al. | |
| 2003/0032409 A1 | 2/2003 | Hutcheson et al. | |
| 2003/0033292 A1 | 2/2003 | Meisel et al. | |
| 2003/0046161 A1 | 3/2003 | Kamangar et al. | |
| 2003/0061211 A1 | 3/2003 | Shultz et al. | |
| 2003/0105677 A1 | 6/2003 | Skinner | |
| 2003/0125977 A1 | 7/2003 | Morioka et al. | |
| 2003/0154072 A1 * | 8/2003 | Young | G06F 17/30017 |
| | | | 704/9 |
| 2003/0220835 A1 | 11/2003 | Barnes, Jr. | |
| 2004/0023666 A1 | 2/2004 | Moon et al. | |
| 2004/0043770 A1 | 3/2004 | Amit et al. | |
| 2004/0044565 A1 | 3/2004 | Kumar et al. | |
| 2004/0044571 A1 | 3/2004 | Bronnimann et al. | |
| 2004/0059712 A1 | 3/2004 | Dean et al. | |
| 2004/0076279 A1 | 4/2004 | Taschereau | |
| 2004/0083133 A1 | 4/2004 | Nicholas et al. | |
| 2004/0085894 A1 | 5/2004 | Wang et al. | |
| 2004/0120323 A1 | 6/2004 | Viikari et al. | |
| 2004/0172389 A1 | 9/2004 | Galai et al. | |
| 2004/0220778 A1 | 11/2004 | Imai et al. | |
| 2005/0074102 A1 | 4/2005 | Altberg et al. | |
| 2005/0076017 A1 | 4/2005 | Rein et al. | |
| 2005/0086104 A1 | 4/2005 | McFadden | |
| 2005/0097204 A1 | 5/2005 | Horowitz et al. | |
| 2005/0137939 A1 | 6/2005 | Calabria et al. | |
| 2005/0144065 A1 | 6/2005 | Calabria et al. | |
| 2005/0144069 A1 | 6/2005 | Wiseman et al. | |
| 2005/0225810 A1 | 10/2005 | Sun | |
| 2005/0234879 A1 | 10/2005 | Zeng et al. | |
| 2006/0004627 A1 | 1/2006 | Baluja | |
| 2006/0149624 A1 | 7/2006 | Baluja et al. | |
| 2006/0195819 A1 | 8/2006 | Chory et al. | |
| 2006/0247913 A1 * | 11/2006 | Huerta | G10L 15/22 |
| | | | 704/1 |
| 2006/0274869 A1 | 12/2006 | Morse | |
| 2006/0287919 A1 | 12/2006 | Rubens et al. | |
| 2007/0097975 A1 | 5/2007 | Rakers et al. | |
| 2007/0127688 A1 | 6/2007 | Doulton | |
| 2007/0282612 A1 * | 12/2007 | Kaneko | G10L 15/22 |
| | | | 704/275 |
| 2007/0294229 A1 * | 12/2007 | Au | G06F 17/30864 |
| 2008/0021604 A1 | 1/2008 | Bouvier et al. | |
| 2008/0049696 A1 | 2/2008 | Stewart | |
| 2008/0052219 A1 | 2/2008 | Sandholm et al. | |
| 2008/0071536 A1 * | 3/2008 | Nagashima | G10L 15/32 |
| | | | 704/246 |
| 2008/0103781 A1 * | 5/2008 | Wasson | G10L 15/22 |
| | | | 704/277 |
| 2008/0270223 A1 | 10/2008 | Collins et al. | |
| 2008/0270224 A1 | 10/2008 | Portman et al. | |
| 2008/0305778 A1 | 12/2008 | Aaltonen et al. | |
| 2009/0210491 A1 * | 8/2009 | Thakkar | H04L 12/1822 |
| | | | 709/204 |
| 2009/0228281 A1 | 9/2009 | Singleton et al. | |
| 2009/0240670 A1 | 9/2009 | Tiyyagura et al. | |
| 2010/0306229 A1 | 12/2010 | Timm et al. | |
| 2011/0010240 A1 | 1/2011 | Veach | |
| 2011/0022460 A1 | 1/2011 | Bhatia et al. | |
| 2011/0087660 A1 | 4/2011 | Yu et al. | |
| 2011/0202494 A1 | 8/2011 | Shin et al. | |
| 2011/0264644 A1 | 10/2011 | Grant et al. | |

(56) References Cited

U.S. PATENT DOCUMENTS

| | | |
|---|---|---|
| 2011/0295990 A1 | 12/2011 | St Jean et al. |
| 2011/0307436 A1 | 12/2011 | Cai et al. |
| 2012/0016897 A1 | 1/2012 | Tulumbas et al. |
| 2012/0030015 A1 | 2/2012 | Brunsman et al. |
| 2012/0101776 A1 | 4/2012 | Brower et al. |
| 2012/0102020 A1 | 4/2012 | Pearson |
| 2012/0138671 A1 | 6/2012 | Gaede et al. |
| 2012/0155838 A1 | 6/2012 | Gerhards et al. |
| 2012/0158954 A1 | 6/2012 | Heffernan et al. |
| 2012/0166277 A1 | 6/2012 | Gnanamani et al. |
| 2012/0265528 A1 | 10/2012 | Gruber et al. |
| 2012/0297174 A1 | 11/2012 | Frank et al. |
| 2013/0013749 A1 | 1/2013 | Kane et al. |
| 2013/0073400 A1* | 3/2013 | Heath .................. G06Q 30/02 705/14.73 |
| 2013/0117022 A1 | 5/2013 | Chen et al. |
| 2013/0124606 A1 | 5/2013 | Carpenter et al. |
| 2013/0144720 A1 | 6/2013 | Hari et al. |
| 2013/0185074 A1* | 7/2013 | Gruber .............. G06F 17/3087 704/257 |
| 2013/0275164 A1 | 10/2013 | Gruber et al. |
| 2013/0304758 A1 | 11/2013 | Gruber et al. |
| 2013/0325449 A1* | 12/2013 | Levien ................... G10L 15/30 704/201 |
| 2014/0095583 A1 | 4/2014 | Houle |
| 2014/0229184 A1* | 8/2014 | Shires .................. H04L 12/12 704/275 |
| 2014/0337028 A1* | 11/2014 | Wang .................. G10L 15/005 704/251 |
| 2014/0350938 A1* | 11/2014 | Schroeter .............. G10L 17/20 704/251 |
| 2015/0081288 A1* | 3/2015 | Kim ..................... G10L 15/30 704/231 |
| 2015/0106085 A1* | 4/2015 | Lindahl ................ G10L 15/32 704/231 |
| 2015/0221305 A1* | 8/2015 | Sharifi .................. G10L 15/26 704/235 |
| 2016/0180846 A1* | 6/2016 | Lee ...................... G10L 15/22 704/251 |
| 2016/0217790 A1* | 7/2016 | Sharifi .................. G10L 15/08 |
| 2016/0223640 A1 | 8/2016 | Vilermo et al. |
| 2017/0069317 A1* | 3/2017 | Kwon .................. G10L 15/20 |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0147585 A1* | 5/2017 | Kleindienst ......... G06F 17/3053 |
| 2017/0358301 A1 | 12/2017 | Raitio et al. |

FOREIGN PATENT DOCUMENTS

| | | |
|---|---|---|
| GB | 2 305 747 | 4/1997 |
| JP | 11-065950 | 1/1900 |
| JP | 11-265347 | 9/1999 |
| JP | 2001-236410 | 8/2001 |
| JP | 2001-282982 | 10/2001 |
| JP | 2001-297256 | 10/2001 |
| JP | 2001-312646 | 11/2001 |
| JP | 2002-007253 | 1/2002 |
| JP | 2002-016970 | 1/2002 |
| JP | 2002-073666 | 3/2002 |
| JP | 2002-099822 | 4/2002 |
| JP | 2002-132827 | 5/2002 |
| JP | 2002-140359 | 5/2002 |
| JP | 2002-169744 | 6/2002 |
| JP | 2002-170027 | 6/2002 |
| JP | 2002-245048 | 8/2002 |
| JP | 2002-288541 A | 10/2002 |
| JP | 2003-016348 | 1/2003 |
| JP | 2003-122781 | 4/2003 |
| JP | 2003-223591 | 8/2003 |
| JP | 2003-263584 | 9/2003 |
| JP | 2003-337893 | 11/2003 |
| JP | 2004-032037 | 1/2004 |
| JP | 2011-192102 | 3/2010 |
| KR | 200054165 | 9/2000 |
| KR | 2002-69767 | 9/2002 |
| KR | 2003-39736 | 5/2003 |
| WO | WO-97/21183 A | 6/1997 |
| WO | WO-00/42544 | 7/2000 |
| WO | WO-01/59546 A2 | 8/2001 |
| WO | WO-01/93138 | 12/2001 |
| WO | WO-2012/094329 | 7/2012 |

OTHER PUBLICATIONS

AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Broussard, Mitchel, "Chatbot-Like Siri Patent Includes Intelligent Image, Video, and Audio Recognition Within Messages", MacRumors, May 11, 2017, 11 pages.
Business Wire, "Global Network, Inc. Enters Into Agreement in Principle With Major Advertising Agency," Oct. 4, 1999.
Canadian Office Action on 2572468 dated Dec. 4, 2014.
Canadian Office Action on 2572468 dated Sep. 17, 2013.
Canadian Office Action on 2572471 dated Jan. 9, 2014.
Canadian Office Action on CA 2,572,471 dated Mar. 3, 2015.
Canadian Office Action to Canadian Patent Application No. 2,572,471 dated Mar. 16, 2009.
Chapter 12, Managing the Product, Class Notes, University of Delaware, http://www.udel.edu/alex/chapt12.html, accessed Mar. 13, 2015, 10 pgs.
Chen, Yilun Lulu, "Alibaba Challenges Google, Amazon With New Echo-Like Device", Bloomberg, Jul. 5, 2017, 3 pages.
Decision of Rejection for Japanese Patent Application No. 2007-519374, dated Jun. 15, 2010 (3 pgs.) with translation (3 pgs.).
Decision of Rejection for Japanese Patent Application No. 2007-519407 dated Feb. 23, 2010.
Decision to Dismiss the Amendment for Korean Patent Application No. 10-2007-7002383 dated Jul. 9, 2010.
Dedrick, R., A Consumption Model for Targeted Electronic Advertising, Intel Architecture Labs, IEEE, 1995.
Dedrick, R., Interactive Electronic Advertising, IEEE, 1994.
Dickinger et al., "An Investigation and Conceptual Model of SMS Marketing," Proceedins of the 37th Hawaii International Conference on System Sciences, 2004, 10 pages.
European Office Action for EP Application No. 05763971.8, dated Mar. 29, 2011.
European Office Action on 05768157.9 dated Jan. 27, 2014.
European Office Action on EP 05 768 157.9 dated Aug. 21, 2014.
European Office Action on EP 05 768 157.9 dated Jul. 23, 2015.
Examiner's First Report on Australian Patent Application No. 2005259861 dated Mar. 6, 2008 (2 pgs.).
Examiner's First Report to Australian Patent Application No. 2005260566 dated Mar. 4, 2008.
Examiner's Re-Examination Report for Australian Patent Application No. 2005259861, dated Dec. 1, 2011 (2 pgs.).
Examiner's Report for Canadian Patent Application No. 2,572,468, dated Dec. 29, 2011 (4 pgs.).
First Examination Report for Indian Patent Application No. 144/MUMNP/2007, dated Jun. 19, 2008 (2 pgs.).
First Office Action for Japanese Patent Application No. 2010-142707 dated Nov. 13, 2012.
First Office Action for Japanese Patent Application No. 2010-232591, dated Feb. 19, 2013 (3 pgs.) with translation (4 pgs.).
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.

(56) References Cited

OTHER PUBLICATIONS

Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '" Cnet, May 18, 2017, 7 pages.
Google Developers Newsletter "Google Assistant SDK", developers.google.com, 2 pages.
Gurma, Mark and Webb, Alex, "Apple Is Manufacturing a Siri Speaker to Outdo Google and Amazon", Bloomberg, May 31, 2017, 3 pages.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
International Search Report & Written Opinion on PCT/US2013/042376 dated Feb. 28, 2014.
Japanese Decision of Rejection on 2010-232591 dated Jan. 27, 2014.
Japanese Office Action issued in JP application 2010-142707 dated Jul. 23, 2013.
Japanese Office Action on JP 2014-010608 dated Nov. 18, 2014, 12 pages (English translation).
Japanese Office Action on JP2010-232591 dated Jun. 9, 2015.
Jones, Matt et al., "Improving Web Interaction in Small Displays", Computer Networks, vol. 31, pp. 1129-1137 (May 17, 1999).
Kato, Sako, "Keyword Advertisement", Internet Magazine, 2nd Stage, No. 2,pp. 112-123, Japan, Impress Holdings, Inc. (May 1, 2004).
Koetsier, John, "Ads on Amazon Echo: Wendy's, ESPN, and Progressive Among Brands Testing", Forbes, May 11, 2017, 3 pages.
Lee, Dave, "The five big announcements from Google I/O", BBC, May 18, 2017, 11 pages.
Microsoft Corporation, "Best Practices for Creating Adaptive User Interfaces with the Mobile Internet Toolkit", Jan. 2002, pp. 1-2, XP008144654.
Notice of Final Rejection for Korean Patent Application No. 10-2007-7002383 dated Apr. 22, 2010.
Notice of Final Rejection for Korean Patent Application No. 10-2007-7002385 dated Jul. 30, 2009 (5 pgs.) with translation (5 ps.).
Notice of Final Rejection for Korean Patent Application No. 10-2010-7013914 dated Sep. 14, 2011.
Notice of Preliminary Rejection for Korean Patent Application No. 10-2007-7002383 dated Jun. 10, 2008.
Notice of Preliminary Rejection for Korean Patent Application No. 10-2007-7002385, dated Jun. 10, 2008 (5 pgs.) with translation (6 pgs.).
Notice of Preliminary Rejection for Korean Patent Application No. 10-2010-7013914, dated Sep. 17, 2010.
Notice of Reasons for Rejection for Japanese Patent Application No. 2007-519374 dated Aug. 25, 2009 (3 pgs.) with translation (4 pgs.).
Notice of Reasons for Rejection for Japanese Patent Application No. 2007-519407 dated Jul. 7, 2009.
Notification of Preliminary Rejection for Korean Patent Application No. 10-2007-7002383 dated Jun. 10, 2009.
Notification of the First Office Action for Chinese Patent Application No. 200580025826.2 dated Dec. 18, 2009 (6 pgs.) with translation (7 pgs.).
Notification of the Second Office Action for Chinese Patent Application No. 200580025826.2, dated Jul. 22, 2011 (3 pgs.) with translation (4 pgs.).
Notification of the Second Office Action for Chinese Patent Application No. 200580025878.X, dated Oct. 26, 2011.
Notification of the Third Office Action for Chinese Patent Application No. 200580025826.2 dated Apr. 11, 2012 (5 pgs.) with translation (7 pgs.).
Notification of the Third Office Action for Chinese Patent Application No. 200580025878.X, dated Feb. 21, 2012.
Office Action for Canadian Patent Application No. 2,572,471, dated May 21, 2010.
Office Action for Chinese Patent Application No. 200580025878.X, dated May 7, 2010.
Office Action for European Patent Application No. 05 763 971.8-2221 dated Mar. 29, 2011 (4 pgs.).
Office Action for European Patent Application No. 05768157.9-1958, dated Feb. 15, 2013.
Office Action for Japanese Patent Application No. 2007-519374, dated May 29, 2012 (19 pgs.) with translation (28 pgs.).
Office Action on U.S. Appl. No. 14/230,508 dated Nov. 28, 2014.
Official Letter of Inquiry for Japanese Patent Application No. 2007-519374 dated Oct. 4, 2011 (3 pgs.).
PCT International Search Report (PCT/ISA/210) for International Application No. PCT/US05/23023 (2 pgs.) (Oct. 23, 2006).
PCT Written Opinion of the International Searching Authority (PCT/ISA/237) for International Application No. PCT/US05/23023 (3 pgs.).
PCT/ISA/210, International Search Report for PCT/US05/23162 dated Feb. 5, 2007.
PCT/ISA/237, Written Opinion of the International Searching Authority forPCT/US05/23162 dated Feb. 5, 2007.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Request for Reexamination of U.S. Pat. No. 6,446,045 B1, Control No. 95/001,061.
Request for Reexamination of U.S. Pat. No. 6,829,587 B2, Control No. 95/001,068.
Request for Reexamination of U.S. Pat. No. 7,240,025 B2, Control No. 95/001,073.
Request for Reexamination of U.S. Pat. No. 7,249,059 B2, Control No. 95/001,069.
Sablich, Justin, "Planning a Trip With the Help of Google Home", New York Times, dated May 31, 2017, 6 pages.
Shintaro Gotoh et al., "Citizens Lectures on GIS using MANDARA and EXCEL, Make a Map by PC," Kokin Shoin (1st ed., Apr. 5, 2004, ISBN 4-7722-4051-9, Kokon, Japan) p. 62.
Smith, Dave, "The Amazon Echo got 2 incredibly useful features thanks to a new update", Business Insider, Jun. 1, 2017, 2 pages.
Statement of Grounds and Particulars in Support of Opposition for Australian Patent Application No. 2005259861, dated Jan. 22, 2010 (13 pgs.).
Supplementary European Search Report for European Patent Application No. 05768157.9 dated Oct. 31, 2012.
Tedeschi, Bob, "Transforming Clicks Into Rings," (Jun. 7, 2004) downloaded fromwww.nvtimes.com on Jun. 6, 2004, 3 pgs.
The International Search Report and The Written Opinion of the International Searching Authority for Application No. PCT/US2013/077834 dated Apr. 24, 2014, 5 pages.
U.S. Final Office Action U.S. Appl. No. 13/441,298 dated Dec. 30, 2013.
U.S. Office Action on U.S. Appl. No. 10/880,686 dated May 7, 2008.
U.S. Office Action on U.S. Appl. No. 10/880,868 dated Apr. 1, 2016.
U.S. Office Action on U.S. Appl. No. 10/880,868 dated Dec. 4, 2008.
U.S. Office Action on U.S. Appl. No. 10/880,868 dated Mar. 24, 2015.
U.S. Office Action on U.S. Appl. No. 10/880,868 dated Nov. 28, 2014.
U.S. Office Action on U.S. Appl. No. 11/026,507 dated Apr. 6, 2015.
U.S. Office Action on U.S. Appl. No. 11/026,507 dated Aug. 14, 2014.
U.S. Office Action on U.S. Appl. No. 11/026,507 dated Jan. 12, 2010.
U.S. Office Action on U.S. Appl. No. 11/026,507 dated Jul. 21, 2010.
U.S. Office Action on U.S. Appl. No. 11/026,507 dated Mar. 24, 2011.
U.S. Office Action on U.S. Appl. No. 11/026,507 dated Mar. 30, 2009.

(56) References Cited

OTHER PUBLICATIONS

U.S. Office Action on U.S. Appl. No. 11/026,507 dated Oct. 29, 2015.
U.S. Office Action on U.S. Appl. No. 13/441,298 dated Jul. 17, 2013.
U.S. Office Action on U.S. Appl. No. 13/441,298 dated Jul. 6, 2015.
U.S. Office Action on U.S. Appl. No. 13/441,298 dated Nov. 20, 2015.
U.S. Office Action on U.S. Appl. No. 13/441,298 dated Jan. 13, 2017.
U.S. Office Action on U.S. Appl. No. 13/478,998 dated Jul. 31, 2015.
U.S. Office Action on U.S. Appl. No. 13/478,998 dated Feb. 27, 2017.
U.S. Office Action on U.S. Appl. No. 13/478,998 dated Jan. 20, 2016.
U.S. Office Action on U.S. Appl. No. 13/478,998 dated Oct. 5, 2016.
U.S. Office Action on U.S. Appl. No. 13/840,380 dated Oct. 22, 2015.
U.S. Office Action on U.S. Appl. No. 13/840,380 dated Aug. 12, 2016.
U.S. Office Action on U.S. Appl. No. 13/840,380 dated Feb. 27, 2017.
U.S. Office Action on U.S. Appl. No. 14/155,323 dated May 7, 2015.
U.S. Office Action on U.S. Appl. No. 14/172,353 dated Jul. 6, 2015.
U.S. Office Action on U.S. Appl. No. 14/172,353 dated Feb. 9, 2017.
U.S. Office Action on U.S. Appl. No. 14/172,353 dated Jan. 21, 2016.
U.S. Office Action on U.S. Appl. No. 14/230,508 dated Feb. 1, 2016.
U.S. Office Action on U.S. Appl. No. 14/230,508 dated Jun. 3, 2015.
Willens, Max, "For publishers, Amazon Alexa holds promise but not much money (yet)", Digiday, Jul. 6, 2017, 5 pages.
Zeff, R. et al., Advertising on the Internet, 2nd Ed., John Wiley & Sons, 1999.
"Walmart and Google to offer voice-enabled shopping", BBC News, Aug. 23, 2017.
Crist, Ry, "Logitech Harmony's Alexa Skill just got a whole lot better", cnet, Jul. 13, 2017 (2 pages).
Gibbs, Samuel, "Your Facebook Messenger app is about to be filled with ads", The Guardian, Jul. 12, 2017 (3 pages).
Hardwick, Tim, "Facebook Smart Speaker Coming Next Year With 15-inch Touch Panel", MacRumors, Jul. 25, 2017 (5 pages).
International Search Report on International Application No. PCT/US2005/023023, dated Oct. 23, 2006, 2 pages.
Kelion, Leo, "Amazon's race to make Alexa smarter", BBC News, Jul. 28, 2017 (8 pages).
U.S. Office Action on U.S. Appl. No. 14/172,353 dated Aug. 10, 2017, 15 pages.
Close, "Amazon Echo Will Give You These Deals If You Order Through Alexa This Weekend," Web Article, Nov. 18, 2016, Time. com (2 pages).
Cook, "A Siri for advertising: These mobile ads talk back to you," Web Article, Apr. 1, 2013, Geekwire.com (7 pages).
Simonite, "How Alexa, Siri, and Google Assistant Will Make Money Off You," Web Article, May 31, 2016, technologyreview. com (11 pages).
Simonite, "How Assistant Could End Up Eating Google's Lunch," Web Article, Sep. 23, 2016, technologyreview.com (9 pages).
"Introducing Echo Look Hands-Free Camera and Style Assistant" 1996-2017, Amazon.com, Inc. 5 pages.
"The Patent Behind Google Home's New Feature of Understanding Different Voices in the Home Surfaced Today", Apr. 20, 2017, 5 pages.
Golgowski, Nina, "This Burger King Ad Is Trying to Control Your Google Home Device", Apr. 12, 2017, 7 pages.
Larson, Selena "Google Home Now Recognizes your Individual Voice" dated Apr. 20, 2017, 3 pages.
Purcher, Jack "Today Google Home's Virtual Assistant Can Learn its Owner's Voice for Security Reason's like Apple's Patent Pending Idea" Apr. 20, 2017, 4 pages.
Seifert, Dan "Samsung's New Virtual Assistant Will Make Using Your Phone Easier", Mar. 20, 2017, 7 pages.
Sherr, Ian "IBM Built a Voice Assistant for Cybersecurity" dated Feb. 13, 2017, 4 pages.
U.S. Notice of Allowance on U.S. Appl. No. 13/478,998 dated Sep. 12, 2017.
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en &answer=160567, on Mar. 18, 2013, 1 page.
Heater, "Amazon Alexa devices can finally tell voices apart", TechCrunch, Oct. 11, 2017, 6 pages.
International Search Report and Written Opinion on International Application No. PCT/US2017/049782, dated Oct. 25, 2017, 16 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Notice of Allowance for U.S. Appl. No. 13/441,298 dated Nov. 2, 2017, 11 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
U.S. Office Action for U.S. Appl. No. 13/840,380 dated Dec. 6, 2017, 13 pages.
U.S. Appl. No. 95/001,061, Reexamination of Stone et al.
U.S. Appl. No. 95/001,068, Reexamination of Stone et al.
U.S. Appl. No. 95/001,069, Reexamination of Stone et al.
U.S. Appl. No. 95/001,073, Reexamination of Stone et al.

\* cited by examiner

MULTIMODAL TRANSMISSION OF PACKETIZED DATA

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

At least one aspect is directed to a system of multi-modal transmission of packetized data in a voice activated data packet based computer network environment. A natural language processor component executed by a data processing system can receive, via an interface of the data processing system, data packets comprising an input audio signal detected by a sensor of a client computing device. The natural language processor component can parse the input audio signal to identify a request and a trigger keyword corresponding to the request. A direct action application programming interface of the data processing system can generate, based on at least one of the request and the trigger keyword, a first action data structure. A content selector component executed by the data processing system can receive at least one of the request and the trigger keyword identified by the natural language processor and can select, based on at least one of the request and the trigger keyword, a content item via a real-time content selection process. An interface management component of the data processing system can poll a plurality of interfaces to identify a first candidate interface and a second candidate interface, and can determine a first resource utilization value for the first candidate interface and a second resource utilization value for the second candidate interface. The first resource utilization value and the second resource utilization value can be based on at least one of a battery status, processor utilization, memory utilization, an interface parameter, and network bandwidth utilization. The interface management component can select, based on a comparison of the first resource utilization value and the second resource utilization value, the first candidate interface as a selected interface to present the content item, and can convert the content item for delivery in a modality compatible with the selected interface selected based on the comparison of the first resource utilization value and the second resource utilization value. The interface management component can provide the first action data structure to the client computing device for rendering as audio output from the client computing device, and can transmit the content item converted for the first modality to deliver the content item for rendering from the selected interface.

At least one aspect is directed to a method of multi-modal transmission of packetized data in a voice activated data packet based computer network environment. The method can receive, by a natural language processor component executed by a data processing system, via an interface of the data processing system, data packets comprising an input audio signal detected by a sensor of a client computing device. The method can identify, by the natural language processor component, from the input audio signal, a request and a trigger keyword corresponding to the request. The method can generate, by a direct action application programming interface of the data processing system, based on at least one of and the trigger keyword, a first action data structure. The method can receive, by a content selector component executed by the data processing system, at least one of the request and the trigger keyword identified by the natural language processor and can select, based on at least one of the request and the trigger keyword, a content item via a real-time content selection process. The method can poll, by an interface management component of the data processing system, a plurality of interfaces to identify a first candidate interface and a second candidate interface. The method can determine, by the interface management component, a first resource utilization value for the first candidate interface and a second resource utilization value for the second candidate interface. The first resource utilization value and the second resource utilization value can be based on at least one of a battery status, processor utilization, memory utilization, an interface parameter, and network bandwidth utilization. The method can select, based on a comparison of the first resource utilization value and the second resource utilization value, the first candidate interface as a selected interface to present the content item. The method can convert the content item for delivery in a modality compatible with the selected interface selected based on the comparison of the first resource utilization value and the second resource utilization value. The method can provide the first action data structure to the client computing device for rendering as audio output from the client computing device. The method can transmit the content item converted for the first modality to deliver the content item for rendering from the selected interface.

At least one aspect is directed to a computer readable storage medium storing instructions that when executed by one or more data processors, cause the one or more data processors to perform operations for multi-modal transmission of packetized data in a voice activated data packet based computer network environment. The operations can receive, by a natural language processor component executed by a data processing system, via an interface of the data processing system, data packets comprising an input audio signal detected by a sensor of a client computing device. The operations can identify, by the natural language processor component, from the input audio signal, a request and a trigger keyword corresponding to the request. The operations can generate, by a direct action application programming interface of the data processing system, based on at least one of and the trigger keyword, a first action data structure. The operations can receive, by a content selector component executed by the data processing system, at least one of the request and the trigger keyword identified by the natural language processor and can select, based on at least one of the request and the trigger keyword, a content item via a real-time content selection process. The operations can poll, by an interface management component of the data processing system, a plurality of interfaces to identify a first candidate interface and a second candidate interface. The operations can determine, by the interface management component, a first resource utilization value for the first candidate interface and a second resource utilization value for the second candidate interface. The first resource utilization value and the second resource utilization value can be based on at least one of a battery status, processor utilization, memory utilization, an interface parameter, and network bandwidth utilization. The operations can select, based on a comparison of the first resource utilization value and the second resource utilization value, the first candidate interface as a selected interface to present the content item. The operations can convert the content item for delivery in a modality compatible with the selected interface selected based on the comparison of the first resource utilization value and the second resource utilization value. The operations can provide the first action data structure to the client computing device for rendering as audio output from the client computing device. The operations can transmit the content item converted for the first modality to deliver the content item for rendering from the selected interface.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
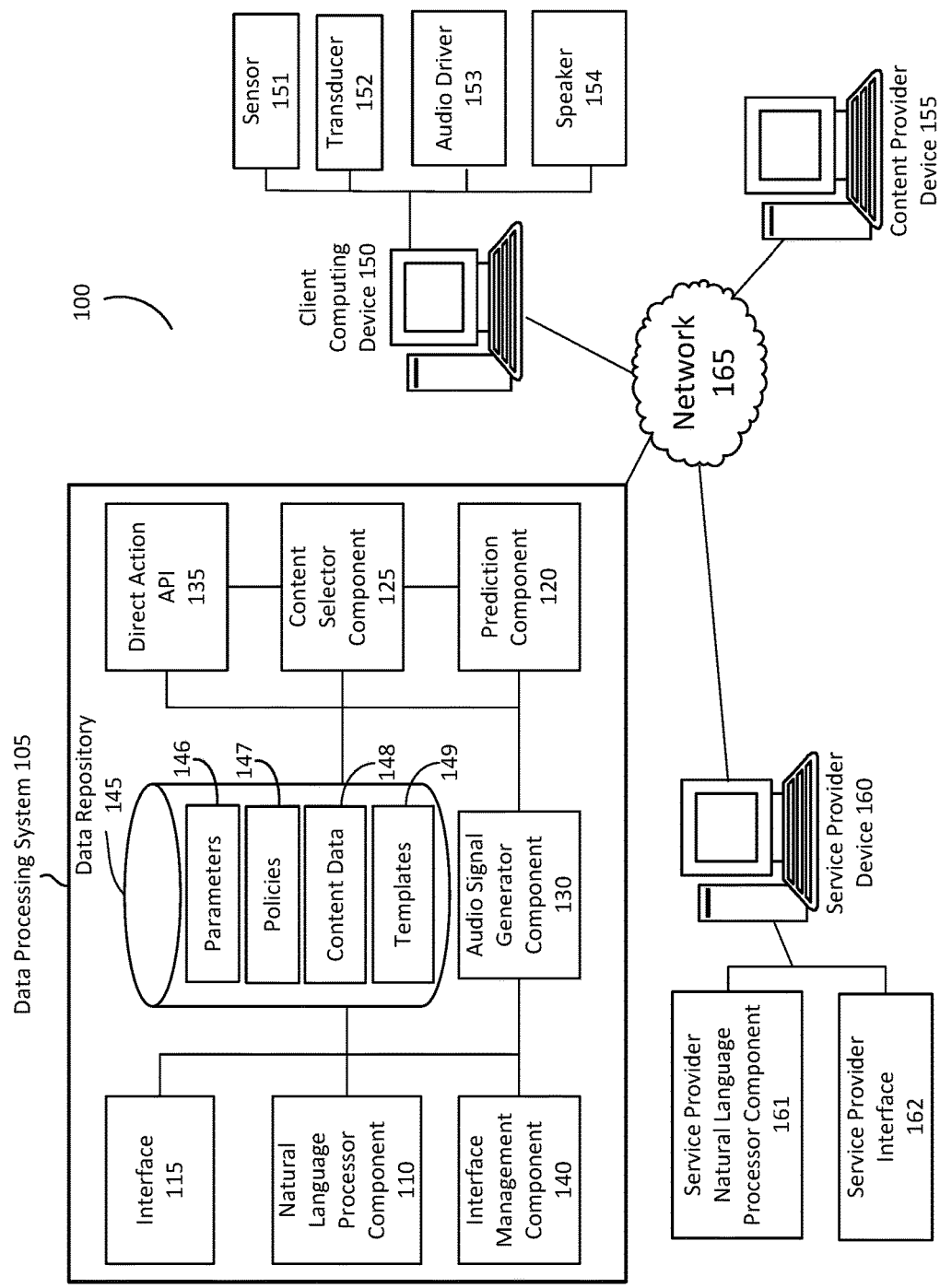
FIG. 1 depicts a system to of multi-modal transmission of packetized data in a voice activated computer network environment.

Following below are more detailed descriptions of various concepts related to, and implementations of, methods, apparatuses, and systems for multi-modal transmission of packetized data in a voice activated data packet based computer network environment. The various concepts introduced above and discussed in greater detail below may be implemented in any of numerous ways.

Systems and methods of the present disclosure relate generally to a data processing system that identifies an optimal transmission modality for data packet (or other protocol based) transmission in a voice activated computer network environment. The data processing system can improve the efficiency and effectiveness of data packet transmission over one or more computer networks by, for example, selecting a transmission modality from a plurality of options for data packet routing through a computer network of content items to one or more client computing device, or to different interfaces (e.g., different apps or programs) of a single client computing device. Data packets or other protocol based signals corresponding to the selected operations can be routed through a computer network between multiple computing devices. For example the data processing system can route a content item to a different interface than an interface from which a request was received. The different interface can be on the same client computing device or a different client computing device from which a request was received. The data processing system can select at least one candidate interface from a plurality of candidate interfaces for content item transmission to a client computing device. The candidate interfaces can be determined based on technical or computing parameters such as processor capability or utilization rate, memory capability or availability, battery status, available power, network bandwidth utilization, interface parameters or other resource utilization values. By selecting an interface to receive and provide the content item for rendering from the client computing device based on candidate interfaces or utilization rates associated with the candidate interfaces, the data processing system can reduce network bandwidth usage, latency, or processing utilization or power consumption of the client computing device that renders the content item. This saves processing power and other computing resources such as memory, reduces electrical power consumption by the data processing system and the reduced data transmissions via the computer network reduces bandwidth requirements and usage of the data processing system.

The systems and methods described herein can include a data processing system that receives an input audio query, which can also be referred to as an input audio signal. From the input audio query the data processing system can identify a request and a trigger keyword corresponding to the request. Based on the trigger keyword or the request, the data processing system can generate a first action data structure. For example, the first action data structure can include an organic response to the input audio query received from a client computing device, and the data processing system can provide the first action data structure to the same client computing device for rendering as audio output via the same interface from which the request was received.

The data processing system can also select at least one content item based on the trigger keyword or the request. The data processing system can identify or determine a plurality of candidate interfaces for rendering of the content item(s). The interfaces can include one or more hardware or software interfaces, such as display screens, audio interfaces, speakers, applications or programs available on the client computing device that originated the input audio query, or on different client computing devices. The interfaces can include java script slots for online documents for the insertion of content items, as well as push notification interfaces. The data processing system can determine utilization values for the different candidate interfaces. The utilization values can indicate power, processing, memory, bandwidth, or interface parameter capabilities, for example. Based on the utilization values for the candidate interfaces the data processing system can select a candidate interface as a selected interface for presentation or rendering of the content item. For example, the data processing system can convert or provide the content item for delivery in a modality compatible with the selected interface. The selected interface can be an interface of the same client computing device that originated the input audio signal or a different client computing device. By routing data packets via a computing network based on utilization values associated with a candidate interface, the data processing system selects a destination for the content item in a manner that can use the least amount of processing power, memory, or bandwidth from available options, or that can conserve power of one or more client computing devices.

The data processing system can provide the content item or the first action data structure by packet or other protocol based data message transmission via a computer network to a client computing device. The output signal can cause an audio driver component of the client computing device to generate an acoustic wave, e.g., an audio output, which can be output from the client computing device. The audio (or other) output can correspond to the first action data structure or to the content item. For example the first action data structure can be routed as audio output, and the content item can be routed as a text based message. By routing the first action data structure and the content item to different interfaces, the data processing system can conserve resources utilized by each interface, relative to providing both the first action data structure and the content item to the same interface. This results in fewer data processing operations, less memory usage, or less network bandwidth utilization by the selected interfaces (or their corresponding devices) than would be the case without separation and independent routing of the first action data structure and the content item.

FIG. 1 depicts an example system 100 to for multi-modal transmission of packetized data in a voice activated data packet (or other protocol) based computer network environment. The system 100 can include at least one data processing system 105. The data processing system 105 can include at least one server having at least one processor. For example, the data processing system 105 can include a plurality of servers located in at least one data center or server farm. The data processing system 105 can determine, from an audio input signal a request and a trigger keyword associated with the request. Based on the request and trigger keyword the data processing system 105 can determine or select at least one action data structure, and can select at least one content item (and initiate other actions as described herein). The data processing system 105 can identify candidate interfaces for rendering of the action data structures or the content items, and can provide the action data structures or the content items for rendering by one or more candidate interfaces on one or more client computing devices based on resource utilization values for or of the candidate interfaces, for example as part of a voice activated communication or planning system. The action data structures (or the content items) can include one or more audio files that when rendered provide an audio output or acoustic wave. The action data structures or the content items can include other content (e.g., text, video, or image content) in addition to audio content.

The data processing system 105 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 105 can include servers in a data center that are stored in one or more high-density rack systems, along with associated storage systems, located for example in an enterprise data center. The data processing system 105 with consolidated servers in this way can improve system manageability, data security, the physical security of the system, and system performance by locating servers and high performance storage systems on localized high performance networks. Centralization of all or some of the data processing system 105 components, including servers and storage systems, and coupling them with advanced system management tools allows more efficient use of server resources, which saves power and processing requirements and reduces bandwidth usage.

The data processing system 105 can include at least one natural language processor (NLP) component 110, at least one interface 115, at least one prediction component 120, at least one content selector component 125, at least one audio signal generator component 130, at least one direct action application programming interface (API) 135, at least one interface management component 140, and at least one data repository 145. The NLP component 110, interface 115, prediction component 120, content selector component 125, audio signal generator component 130, direct action API 135, and interface management component 140 can each include at least one processing unit, server, virtual server, circuit, engine, agent, appliance, or other logic device such as programmable logic arrays configured to communicate with the data repository 145 and with other computing devices (e.g., at least one client computing device 150, at least one content provider computing device 155, or at least one service provider computing device 160) via the at least one computer network 165. The network 165 can include computer networks such as the internet, local, wide, metro or other area networks, intranets, satellite networks, other computer networks such as voice or data mobile phone communication networks, and combinations thereof.

The network 165 can include or constitute a display network, e.g., a subset of information resources available on the internet that are associated with a content placement or search engine results system, or that are eligible to include third party content items as part of a content item placement campaign. The network 165 can be used by the data processing system 105 to access information resources such as web pages, web sites, domain names, or uniform resource locators that can be presented, output, rendered, or displayed by the client computing device 150. For example, via the network 165 a user of the client computing device 150 can access information or data provided by the data processing system 105, the content provider computing device 155 or the service provider computing device 160.

The network 165 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 165 can include a wireless link, such as an infrared channel or satellite band. The topology of the network 165 may include a bus, star, or ring network topology. The network 165 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 150, the content provider computing device 155, and the service provider computing device 160 can each include at least one logic device such as a computing device having a processor to communicate with each other or with the data processing system 105 via the network 165. The client computing device 150, the content provider computing device 155, and the service provider computing device 160 can each include at least one server, processor or memory, or a plurality of computation resources or servers located in at least one data center. The client computing device 150, the content provider computing device 155, and the service provider computing device 160 can each include at least one computing device such as a desktop computer, laptop, tablet, personal digital assistant, smartphone, portable computer, server, thin client computer, virtual server, or other computing device.

The client computing device 150 can include at least one sensor 151, at least one transducer 152, at least one audio driver 153, and at least one speaker 154. The sensor 151 can include a microphone or audio input sensor. The transducer 152 can convert the audio input into an electronic signal, or vice-versa. The audio driver 153 can include a script or program executed by one or more processors of the client computing device 150 to control the sensor 151, the transducer 152 or the audio driver 153, among other components of the client computing device 150 to process audio input or provide audio output. The speaker 154 can transmit the audio output signal.

The client computing device 150 can be associated with an end user that enters voice queries as audio input into the client computing device 150 (via the sensor 151) and receives audio output in the form of a computer generated voice that can be provided from the data processing system 105 (or the content provider computing device 155 or the service provider computing device 160) to the client computing device 150, output from the speaker 154. The audio output can correspond to an action data structure received from the direct action API 135, or a content item selected by the content selector component 125. The computer generated voice can include recordings from a real person or computer generated language.

The content provider computing device 155 (or the data processing system 105 or service provider computing device 160) can provide audio based content items or action data structures for display by the client computing device 150 as an audio output. The action data structure or content item can include an organic response or offer for a good or service, such as a voice based message that states: "Today it will be sunny and 80 degrees at the beach" as an organic response to a voice-input query of "Is today a beach day?". The data processing system 105 (or other system 100 component such as the content provider computing device 155 can also provide a content item as a response, such as a voice or text message based content item offering sunscreen.

The content provider computing device 155 or the data repository 145 can include memory to store a series of audio action data structures or content items that can be provided in response to a voice based query. The action data structures and content items can include packet based data structures for transmission via the network 165. The content provider computing device 155 can also provide audio or text based content items (or other content items) to the data processing system 105 where they can be stored in the data repository 145. The data processing system 105 can select the audio action data structures or text based content items and provide (or instruct the content provider computing device 155 to provide) them to the same or different client computing devices 150 responsive to a query received from one of those client computing device 150. The audio based action data structures can be exclusively audio or can be combined with text, image, or video data. The content items can be exclusively text or can be combined with audio, image or video data.

The service provider computing device 160 can include at least one service provider natural language processor (NLP) component 161 and at least one service provider interface 162. The service provider NLP component 161 (or other components such as a direct action API of the service provider computing device 160) can engage with the client computing device 150 (via the data processing system 105 or bypassing the data processing system 105) to create a back-and-forth real-time voice or audio based conversation (e.g., a session) between the client computing device 150 and the service provider computing device 160. For example, the service provider interface 162 can receive or provide data messages (e.g., action data structures or content items) to the direct action API 135 of the data processing system 105. The direct action API 135 can also generate the action data structures independent from or without input from the service provider computing device 160. The service provider computing device 160 and the content provider computing device 155 can be associated with the same entity. For example, the content provider computing device 155 can create, store, or make available content items for beach relates services, such as sunscreen, beach towels or bathing suits, and the service provider computing device 160 can establish a session with the client computing device 150 to respond to a voice input query about the weather at the beach, directions for a beach, or a recommendation for an area beach, and can provide these content items to the end user of the client computing device 150 via an interface of the same client computing device 150 from which the query was received, a different interface of the same client computing device 150, or an interface of a different client computing device. The data processing system 105, via the direct action API 135, the NLP component 110 or other components can also establish the session with the client computing device, including or bypassing the service provider computing device 160, to for example to provide an organic response to a query related to the beach.

The data repository 145 can include one or more local or distributed databases, and can include a database management system. The data repository 145 can include computer data storage or memory and can store one or more parameters 146, one or more policies 147, content data 148, or templates 149 among other data. The parameters 146, policies 147, and templates 149 can include information such as rules about a voice based session between the client computing device 150 and the data processing system 105 (or the service provider computing device 160). The content data 148 can include content items for audio output or associated metadata, as well as input audio messages that can be part of one or more communication sessions with the client computing device 150.

The system 100 can optimize processing of action data structures and content items in a voice activated data packet (or other protocol) environment. For example, the data processing system 105 can include or be part of a voice activated assistant service, voice command device, intelligent personal assistant, knowledge navigator, event planning, or other assistant program. The data processing system 105 can provide one or more instances of action data structures as audio output for display from the client computing device 150 to accomplish tasks related to an input audio signal. For example, the data processing system can communicate with the service provider computing device 160 or other third party computing devices to generate action data structures with information about a beach, among other things. For example, an end user can enter an input audio signal into the client computing device 150 of: "OK, I would like to go to the beach this weekend" and an action data structure can indicate the weekend weather forecast for area beaches, such as "it will be sunny and 80 degrees at the beach on Saturday, with high tide at 3 pm."

The action data structures can include a number of organic or non-sponsored responses to the input audio signal. For example, the action data structures can include a beach weather forecast or directions to a beach. The action data structures in this example include organic, or non-sponsored content that is directly responsive to the input audio signal. The content items responsive to the input audio signal can include sponsored or non-organic content, such as an offer to buy sunscreen from a convenience store located near the beach. In this example, the organic action data structure (beach forecast) is responsive to the input audio signal (a query related to the beach), and the content item (a reminder or offer for sunscreen) is also responsive to the same input audio signal. The data processing system 105 can evaluate system 100 parameters (e.g., power usage, available displays, formats of displays, memory requirements, bandwidth usage, power capacity or time of input power (e.g., internal battery or external power source such as a power source from a wall output) to provide the action data structure and the content item to different candidate interfaces on the same client computing device 150, or to different candidate interfaces on different client computing devices 150.

The data processing system 105 can include an application, script or program installed at the client computing device 150, such as an app to communicate input audio signals (e.g., as data packets via a packetized or other protocol based transmission) to at least one interface 115 of the data processing system 105 and to drive components of the client computing device 150 to render output audio signals (e.g., for action data structures) or other output signals (e.g., content items). The data processing system 105 can receive data packets or other signal that includes or identifies an audio input signal. For example, the data processing system 105 can execute or run the NLP component 110 to receive the audio input signal.

The NLP component 110 can convert the audio input signal into recognized text by comparing the input signal against a stored, representative set of audio waveforms (e.g., in the data repository 145) and choosing the closest matches. The representative waveforms are generated across a large set of users, and can be augmented with speech samples. After the audio signal is converted into recognized text, the NLP component 110 can match the text to words that are associated, for example via training across users or through manual specification, with actions that the data processing system 105 can serve.

The audio input signal can be detected by the sensor 151 (e.g., a microphone) of the client computing device. Via the transducer 152, the audio driver 153, or other components the client computing device 150 can provide the audio input signal to the data processing system 105 (e.g., via the network 165) where it can be received (e.g., by the interface 115) and provided to the NLP component 110 or stored in the data repository 145 as content data 148.

The NLP component 110 can receive or otherwise obtain the input audio signal. From the input audio signal, the NLP component 110 can identify at least one request or at least one trigger keyword corresponding to the request. The request can indicate intent or subject matter of the input audio signal. The trigger keyword can indicate a type of action likely to be taken. For example, the NLP component 110 can parse the input audio signal to identify at least one request to go to the beach for the weekend. The trigger keyword can include at least one word, phrase, root or partial word, or derivative indicating an action to be taken. For example, the trigger keyword "go" or "to go to" from the input audio signal can indicate a need for transport or a trip away from home. In this example, the input audio signal (or the identified request) does not directly express an intent for transport, however the trigger keyword indicates that transport is an ancillary action to at least one other action that is indicated by the request.

The prediction component 120 (or other mechanism of the data processing system 105) can generate, based on the request or the trigger keyword, at least one action data structure associated with the input audio signal. The action data structure can indicate information related to subject matter of the input audio signal. The action data structure can include one or more than one action, such as organic responses to the input audio signal. For example, the input audio signal "OK, I would like to go to the beach this weekend" can include at least one request indicating an interest for a beach weather forecast, surf report, or water temperature information, and at least one trigger keyword, e.g., "go" indicating travel to the beach, such as a need for items one may want to bring to the beach, or a need for transportation to the beach. The prediction component 120 can generate or identify subject matter for at least one action data structure, an indication of a request for a beach weather forecast, as well as subject matter for a content item, such as an indication of a query for sponsored content related to spending a day at a beach. From the request or the trigger keyword the prediction component 120 (or other system 100 component such as the NLP component 110 or the direct action API 135) predicts, estimates, or otherwise determines subject matter for action data structures or for content items. From this subject matter, the direct action API 135 can generate at least one action data structure and can communicate with at least one content provider computing device 155 to obtain at least one content item 155. The prediction component 120 can access the parameters 146 or policies 147 in the data repository 145 to determine or otherwise estimate requests for action data structures or content items. For example, the parameters 146 or policies 147 could indicate requests for a beach weekend weather forecast action or for content items related to beach visits, such as a content item for sunscreen.

The content selector component 125 can obtain indications of any of the interest in or request for the action data structure or for the content item. For example, the prediction component 120 can directly or indirectly (e.g., via the data repository 145) provide an indication of the action data structure or content item to the content selector component 125. The content selector component 125 can obtain this information from the data repository 145, where it can be stored as part of the content data 148. The indication of the action data structure can inform the content selector component 125 of a need for area beach information, such as a weather forecast or products or services the end user may need for a trip to the beach.

From the information received by the content selector component 125, e.g., an indication of a forthcoming trip to the beach, the content selector component 125 can identify at least one content item. The content item can be responsive or related to the subject matter of the input audio query. For example, the content item can include data message identifying as tore near the beach that has sunscreen, or offering a taxi ride to the beach. The content selector component 125 can query the data repository 145 to select or otherwise identify the content item, e.g., from the content data 148. The content selector component 125 can also select the content item from the content provider computing device 155. For example responsive to a query received from the data processing system 105, the content provider computing device 155 can provide a content item to the data processing system 105 (or component thereof) for eventual output by the client computing device 150 that originated the input audio signal, or for output to the same end user by a different client computing device 150.

The audio signal generator component 130 can generate or otherwise obtain an output signal that includes the content item (as well as the action data structure) responsive to the input audio signal. For example, the data processing system 105 can execute the audio signal generator component 130 to generate or create an output signal corresponding to the action data structure or to the content item. The interface component 115 of the data processing system 105 can provide or transmit one or more data packets that include the output signal via the computer network 165 to any client computing device 150. The interface 115 can be designed, configured, constructed, or operational to receive and transmit information using, for example, data packets. The interface 115 can receive and transmit information using one or more protocols, such as a network protocol. The interface 115 can include a hardware interface, software interface, wired interface, or wireless interface. The interface 115 can facilitate translating or formatting data from one format to another format. For example, the interface 115 can include an application programming interface that includes definitions for communicating between various components, such as software components of the system 100.

The data processing system 105 can provide the output signal including the action data structure from the data repository 145 or from the audio signal generator component 130 to the client computing device 150. The data processing system 105 can provide the output signal including the content item from the data repository 145 or from the audio signal generator component 130 to the same or to a different client computing device 150.

The data processing system 105 can also instruct, via data packet transmissions, the content provider computing device 155 or the service provider computing device 160 to provide the output signal (e.g., corresponding to the action data structure or to the content item) to the client computing device 150. The output signal can be obtained, generated, transformed to or transmitted as one or more data packets (or other communications protocol) from the data processing system 105 (or other computing device) to the client computing device 150.

The content selector component 125 can select the content item or the action data structure for the as part of a real-time content selection process. For example, the action data structure can be provided to the client computing device 150 for transmission as audio output by an interface of the client computing device 150 in a conversational manner in direct response to the input audio signal. The real-time content selection process to identify the action data structure and provide the content item to the client computing device 150 can occur within one minute or less from the time of the input audio signal and be considered real-time. The data processing system 105 can also identify and provide the content item to at least one interface of the client computing device 150 that originated the input audio signal, or to a different client computing device 150.

The action data structure (or the content item), for example obtained or generated by the audio signal generator component 130 transmitted via the interface 115 and the computer network 165 to the client computing device 150, can cause the client computing device 150 to execute the audio driver 153 to drive the speaker 154 to generate an acoustic wave corresponding to the action data structure or to the content item. The acoustic wave can include words of or corresponding to the action data structure or content item.

The acoustic wave representing the action data structure can be output from the client computing device 150 separately from the content item. For example, the acoustic wave can include the audio output of "Today it will be sunny and 80 degrees at the beach." In this example, the data processing system 105 obtains the input audio signal of, for example, "OK, I would like to go to the beach this weekend." From this information the NLP component 110 identifies at least one request or at least one trigger keyword, and the prediction component 120 uses the request(s) or trigger keyword(s) to identify a request for an action data structure or for a content item. The content selector component 125 (or other component) can identify, select, or generate a content item for, e.g., sunscreen available near the beach. The direct action API 135 (or other component) can identify, select, or generate an action data structure for, e.g., the weekend beach forecast. The data processing system 105 or component thereof such as the audio signal generator component 130 can provide the action data structure for output by an interface of the client computing device 150. For example, the acoustic wave corresponding to the action data structure can be output from the client computing device 150. The data processing system 105 can provide the content item for output by a different interface of the same client computing device 150 or by an interface of a different client computing device 150.

The packet based data transmission of the action data structure by data processing system 105 to the client computing device 150 can include a direct or real-time response to the input audio signal of "OK, I would like to go to the beach this weekend" so that the packet based data transmissions via the computer network 165 that are part of a communication session between the data processing system 105 and the client computing device 150 with the flow and feel of a real-time person to person conversation. This packet based data transmission communication session can also include the content provider computing device 155 or the service provider computing device 160.

The content selector component 125 can select the content item or action data structure based on at least one request or at least one trigger keyword of the input audio signal. For example, the requests of the input audio signal "OK, I would like to go to the beach this weekend" can indicate subject matter of the beach, travel to the beach, or items to facilitate a trip to the beach. The NLP component 110 or the prediction component 120 (or other data processing system 105 components executing as part of the direct action API 135) can identify the trigger keyword "go" "go to" or "to go to" and can determine a transportation request to the beach based at least in part on the trigger keyword. The NLP component 110 (or other system 100 component) can also determine a solicitation for content items related to beach activity, such as for sunscreen or beach umbrellas. Thus, the data processing system 105 can infer actions from the input audio signal that are secondary requests (e.g., a request for sunscreen) that are not the primary request or subject of the input audio signal (information about the beach this weekend).

The action data structures and content items can correspond to subject matter of the input audio signal. The direct action API 135 can execute programs or scripts, for example from the NLP component 110, the prediction component 120, or the content selector component 125 to identify action data structures or content items for one or more of these actions. The direct action API 135 can execute a specified action to satisfy the end user's intention, as determined by the data processing system 105. Depending on the action specified in its inputs, the direct action API 135 can execute code or a dialog script that identifies the parameters required to fulfill a user request. Such code can lookup additional information, e.g., in the data repository 145, such as the name of a home automation service, or it can provide audio output for rendering at the client computing device 150 to ask the end user questions such as the intended destination of a requested taxi. The direct action API 135 can determine necessary parameters and can package the information into an action data structure, which can then be sent to another component such as the content selector component 125 or to the service provider computing device 160 to be fulfilled.

The direct action API 135 of the data processing system 105 can generate, based on the request or the trigger keyword, the action data structures. The action data structures can be generated responsive to the subject matter of the input audio signal. The action data structures can be included in the messages that are transmitted to or received by the service provider computing device 160. Based on the audio input signal parsed by the NLP component 110, the direct action API 135 can determine to which, if any, of a plurality of service provider computing devices 160 the message should be sent. For example, if an input audio signal includes "OK, I would like to go to the beach this weekend," the NLP component 110 can parse the input audio signal to identify requests or trigger keywords such as the trigger keyword word "to go to" as an indication of a need for a taxi. The direct action API 135 can package the request into an action data structure for transmission as a message to a service provider computing device 160 of a taxi service. The message can also be passed to the content selector component 125. The action data structure can include information for completing the request. In this example, the information can include a pick up location (e.g., home) and a destination location (e.g., a beach). The direct action API 135 can retrieve a template 149 from the data repository 145 to determine which fields to include in the action data structure. The direct action API 135 can retrieve content from the data repository 145 to obtain information for the fields of the data structure. The direct action API 135 can populate the fields from the template with that information to generate the data structure. The direct action API 135 can also populate the fields with data from the input audio signal. The templates 149 can be standardized for categories of service providers or can be standardized for specific service providers. For example, ride sharing service providers can use the following standardized template 149 to create the data structure: {client_device_identifier; authentication_credentials; pick_up_location; destination_location; no_passengers; service level}.

The content selector component 125 can identify, select, or obtain multiple content items resulting from a multiple content selection processes. The content selection processes can be real-time, e.g., part of the same conversation, communication session, or series of communications sessions between the data processing system 105 and the client computing device 150 that involve common subject matter. The conversation can include asynchronous communications separated from one another by a period of hours or days, for example. The conversation or communication session can last for a time period from receipt of the first input audio signal until an estimated or known conclusion of a final action related to the first input audio signal, or receipt by the data processing system 105 of an indication of a termination or expiration of the conversation. For example, the data processing system 105 can determine that a conversation related to a weekend beach trip begins at the time or receipt of the input audio signal and expires or terminates at the end of the weekend, e.g., Sunday night or Monday morning. The data processing system 105 that provides action data structures or content items for rendering by one or more interfaces of the client computing device 150 or of another client computing device 150 during the active time period of the conversation (e.g., from receipt of the input audio signal until a determined expiration time) can be considered to be operating in real-time. In this example the content selection processes and rendering of the content items and action data structures occurs in real time.

The interface management component 140 can poll, determine, identify, or select interfaces for rendering of the action data structures and of the content items related to the input audio signal. For example, the interface management component 140 can identify one or more candidate interfaces of client computing devices 150 associated with an end user that entered the input audio signal (e.g., "What is the weather at the beach today?") into one of the client computing devices 150 via an audio interface. The interfaces can include hardware such as sensor 151 (e.g., a microphone), speaker 154, or a screen size of a computing device, alone or combined with scripts or programs (e.g., the audio driver 153) as well as apps, computer programs, online documents (e.g., webpage) interfaces and combinations thereof.

The interfaces can include social media accounts, text message applications, or email accounts associated with an end user of the client computing device 150 that originated the input audio signal. Interfaces can include the audio output of a smartphone, or an app based messaging device installed on the smartphone, or on a wearable computing device, among other client computing devices 150. The interfaces can also include display screen parameters (e.g., size, resolution), audio parameters, mobile device parameters, (e.g., processing power, battery life, existence of installed apps or programs, or sensor 151 or speaker 154 capabilities), content slots on online documents for text, image, or video renderings of content items, chat applications, laptops parameters, smartwatch or other wearable device parameters (e.g., indications of their display or processing capabilities), or virtual reality headset parameters.

The interface management component 140 can poll a plurality of interfaces to identify candidate interfaces. Candidate interfaces include interfaces having the capability to render a response to the input audio signal, (e.g., the action data structure as an audio output, or the content item that can be output in various formats including non-audio formats). The interface management component 140 can determine parameters or other capabilities of interfaces to determine that they are (or are not) candidate interfaces. For example, the interface management component 140 can determine, based on parameters 146 of the content item or of a first client computing device 150 (e.g., a smartwatch wearable device), that the smartwatch includes an available visual interface of sufficient size or resolution to render the content item. The interface management component 140 can also determine that the client computing device 150 that originated the input audio signal has a speaker 154 hardware and installed program e.g., an audio driver or other script to render the action data structure.

The interface management component 140 can determine utilization values for candidate interfaces. The utilization values can indicate that a candidate interface can (or cannot) render the action data structures or the content items provided in response to input audio signals. The utilization values can include parameters 146 obtained from the data repository 145 or other parameters obtained from the client computing device 150, such as bandwidth or processing utilizations or requirements, processing power, power requirements, battery status, memory utilization or capabilities, or other interface parameters that indicate the available of an interface to render action data structures or content items. The battery status can indicate a type of power source (e.g., internal battery or external power source such as via an output), a charging status (e.g., currently charging or not), or an amount of remaining battery power. The interface management component 140 can select interfaces based on the battery status or charging status.

The interface management component 140 can order the candidate interfaces in a hierarchy or ranking based on the utilization values. For example different utilization values (e.g., processing requirements, display screen size, accessibility to the end user) can be given different weights. The interface management component 140 can rank one or more of the utilization values of the candidate interfaces based on their weights to determine an optimal corresponding candidate interface for rendering of the content item (or action data structure). Based on this hierarchy, the interface management component 140 can select the highest ranked interface for rendering of the content item.

Based on utilization values for candidate interfaces, the interface management component 140 can select at least one candidate interface as a selected interface for the content item. The selected interface for the content item can be the same interface from which the input audio signal was received (e.g., an audio interface of the client computing device 150) or a different interface (e.g., a text message based app of the same client computing device 150, or an email account accessible from the same client computing device 150.

The interface management component 140 can select an interface for the content item that is an interface of a different client computing device 150 than the device that originated the input audio signal. For example, the data processing system 105 can receive the input audio signal from a first client computing device 150 (e.g., a smartphone), and can select an interface such as a display of a smartwatch (or any other client computing device for rendering of the content item. The multiple client computing devices 150 can all be associated with the same end user. The data processing system 105 can determine that multiple client computing devices 150 are associated with the same end user based on information received with consent from the end user such as user access to a common social media or email account across multiple client computing devices 150.

The interface management component 140 can also determine that an interface is unavailable. For example the interface management component 140 can poll interfaces and determine that a battery status of a client computing device 150 associated with the interface is low, or below a threshold level such as 10%. Or the interface management component 140 can determine that the client computing device 150 associated with the interface lacks sufficient display screen size or processing power to render the content item, or that the processor utilization rate is too high, as the client computing device is currently executing another application, for example to stream content via the network 165. In these and other examples the interface management component 140 can determine that the interface is unavailable and can eliminate the interface as a candidate for rendering the content item or the action data structure.

Thus, the interface management component 140 can determine that a candidate interface accessible by the first client computing device 150 is linked to an account of an end user, and that a second candidate interface accessible by a second client computing device 150 is also linked to the same account. For example, both client computing devices 150 may have access to the same social media account, e.g., via installation of an app or script at each client computing device 150. The interface management component 140 can also determine that multiple interfaces correspond to the same account, and can provide multiple, different content items to the multiple interfaces corresponding to the common account. For example, the data processing system 105 can determine, with end user consent, that an end user has accessed an account from different client computing devices 150. These multiple interfaces can be separate instances of the same interface (e.g., the same app installed on different client computing devices 150) or different interfaces such as different apps for different social media accounts that are both linked to a common email address account, accessible from multiple client computing devices 150.

The interface management component 140 can also determine or estimate distances between client computing devices 150 associated with candidate interfaces. For example, the data processing system 105 can obtain, with user consent, an indication that the input audio signal originated from a smartphone or virtual reality headset computing device 150, and that the end user is associated with an active smartwatch client computing device 150. From this information the interface management component can determine that the smartwatch is active, e.g., being worn by the end user when the end user enters the input audio signal into the smartphone, so that the two client computing devices 150 are within a threshold distance of one another. In another example, the data processing system 105 can determine, with end user consent, the location of a smartphone that is the source of an input audio signal, and can also determine that a laptop account associated with the end user is currently active. For example, the laptop can be signed into a social media account indicating that the user is currently active on the laptop. In this example the data processing system 105 can determine that the end user is within a threshold distance of the smartphone and of the laptop, so that the laptop can be an appropriate choice for rendering of the content item via a candidate interface.

The interface management component 140 can select the interface for the content item based on at least one utilization value indicating that the selected interface is the most efficient for the content item. For example, from among candidate interfaces, the interface to render the content item at the smartwatch uses the least bandwidth due as the content item is smaller and can be transmitted with fewer resources. Or the interface management component 140 can determine that the candidate interface selected for rendering of the content item is currently charging (e.g., plugged in) so that rendering of the content item by the interface will not drain battery power of the corresponding client computing device 150. In another example, the interface management component 140 can select a candidate interface that is currently performing fewer processing operations than another, unselected interface of for example a different client computing device 150 that is currently streaming video content from the network 165 and therefore less available to render the content item without delay.

The interface management component 140 (or other data processing system 105 component) can convert the content item for delivery in a modality compatible with the candidate interface. For example, if the candidate interface is a display of a smartwatch, smartphone, or tablet computing device, the interface management component 140 can size the content item for appropriate visual display given the dimensions of the display screen associated with the interface. The interface management component 140 can also convert the content item to a packet or other protocol based format, including proprietary or industry standard format for transmission to the client computing device 150 associated with the selected interface. The interface selected by the interface management component 140 for the content item can include an interface accessible from multiple client computing devices 150 by the end user. For example, the interface can be or include a social media account that the end user can access via the client computing device 150 that originated the input audio signal (e.g., a smartphone) as well as other client computing devices such as tabled or desktop computers or other mobile computing devices.

The interface management component 140 can also select at least one candidate interface for the action data structure. This interface can be the same interface from which the input audio signal was obtained, e.g., a voice activated assistant service executed at a client computing device 150. This can be the same interface or a different interface than the interface management component 140 selects for the content item. The interface management component 140 (or other data processing system 105 components) can provide the action data structure to the same client computing device 150 that originated the input audio signal for rendering as audio output as part of the assistant service. The interface management component 140 can also transmit or otherwise provide the content item to the selected interface for the content item, in any converted modality appropriate for rendering by the selected interface.

Thus, the interface management component 140 can provide the action data structure as audio output for rendering by an interface of the client computing device 150 responsive to the input audio signal received by the same client computing device 150. The interface management component 140 can also provide the content item for rendering by a different interface of the same client computing device 150 or of a different client computing device 150 associated with the same end user. For example, the action data structure, e.g., "it will be sunny and 80 degrees at the beach on Saturday" can be provided for audio rendering by the client computing device as part of an assistant program interface executing in part at the client computing device 150, and the content item e.g., a text, audio, or combination content item indicating that "sunscreen is available from the convenience store near the beach" can be provided for rendering by an interface of the same or a different computing device 150, such as an email or text message accessible by the same or a different client computing device 150 associated with the end user.

Separating the content item from the action data structure and sending the content item as, for example, a text message rather than an audio message can result in reduced processing power for the client computing device 150 that accesses the content item since, for example, text message data transmissions are less computationally intensive than audio message data transmissions. This separation can also reduce power usage, memory storage, or transmission bandwidth used to render the content item. This results in increased processing, power, and bandwidth efficiencies of the system 100 and devices such as the client computing devices 150 and the data processing system 105. This increases the efficiency of the computing devices that process these transactions, and increases the speed with which the content items can be rendered. The data processing system 105 can process thousands, tens of thousands or more input audio signals simultaneously so the bandwidth, power, and processing savings can be significant and not merely incremental or incidental.

The interface management component 140 can provide or deliver the content item to the same client computing device 150 (or a different device) as the action data structure subsequent to delivery of the action data structure to the client computing device 150. For example, the content item can be provided for rendering via the selected interface upon conclusion of audio output rendering of the action data structure. The interface management component 140 can also provide the content item to the selected interface concurrent with the provision of the action data structure to the client computing device 150. The interface management component 140 can provide the content item for delivery via the selected interface within a pre-determined time period from receipt of the input audio signal by the NLP component 110. The time period, for example, can be any time during an active length of the conversation of session. For example, if the input audio signal is "I would like to go to the beach this weekend" the pre-determined time period can be any time from receipt of the input audio signal through the end of the weekend, e.g., the active period of the conversation. The pre-determined time period can also be a time triggered from rendering of the action data structure as audio output by the client computing device 150, such as within 5 minutes, one hour or one day of this rendering.

The interface management component 140 can provide the action data structure to the client computing device 150 with an indication of the existence of the content item. For example, the data processing system 105 can provide the action data structure that renders at the client computing device 150 to provide the audio output "it will be sunny and 80 degrees at the beach on Saturday, check your email for more information." The phrase "check your email for more information" can indicate the existence of a content item, e.g., for sunscreen, provided by the data processing system 105 to an interface (e.g., email). In this example, sponsored content can be provided as content items to the email (or other) interface and organic content such as the weather can be provided as the action data structure for audio output.

The data processing system 105 can also provide the action data structure with a prompt that queries the user to determine user interest in obtaining the content item. For example, the action data structure can indicate "it will be sunny and 80 degrees at the beach on Saturday, would you like to hear about some services to assist with your trip?" The data processing system 105 can receive another audio input signal from the client computing device 150 in response to the prompt "would you like to hear about some services to assist with your trip?" such as "sure". The NLP component 110 can parse this response, e.g., "sure" and interpret it as authorization for audio rendering of the content item by the client computing device 150. In response, the data processing system 105 can provide the content item for audio rendering by the same client computing device 150 from which the response "sure" originated.

The data processing system 105 can delay transmission of the content item associated with the action data structure to optimize processing utilization. For example, the data processing system 105 provide the action data structure for rendering as audio output by the client computing device in real-time responsive to receipt of the input audio signal, e.g., in a conversational manner, and can delay content item transmission until an off-peak or non-peak period of data center usage, which results in more efficient utilization of the data center by reducing peak bandwidth usage, heat output or cooling requirements. The data processing system 105 can also initiate a conversion or other activity associated with the content item, such as ordering a car service responsive to a response to the action data structure or to the content item, based on data center utilization rates or bandwidth metrics or requirements of the network 165 or of a data center that includes the data processing system 105.

Based on a response to a content item or to the action data structure for a subsequent action, such as a click on the content item rendered via the selected interface, the data processing system 105 can identify a conversion, or initiate a conversion or action. Processors of the data processing system 105 can invoke the direct action API 135 to execute scripts that facilitate the conversion action, such as to order a car from a car share service to take the end user to or from the beach. The direct action API 135 can obtain content data 148 (or parameters 146 or policies 147) from the data repository 145, as well as data received with end user consent from the client computing device 150 to determine location, time, user accounts, logistical or other information in order to reserve a car from the car share service. Using the direct action API 135, the data processing system 105 can also communicate with the service provider computing device 160 to complete the conversion by in this example making the car share pick up reservation.

Figure 2:
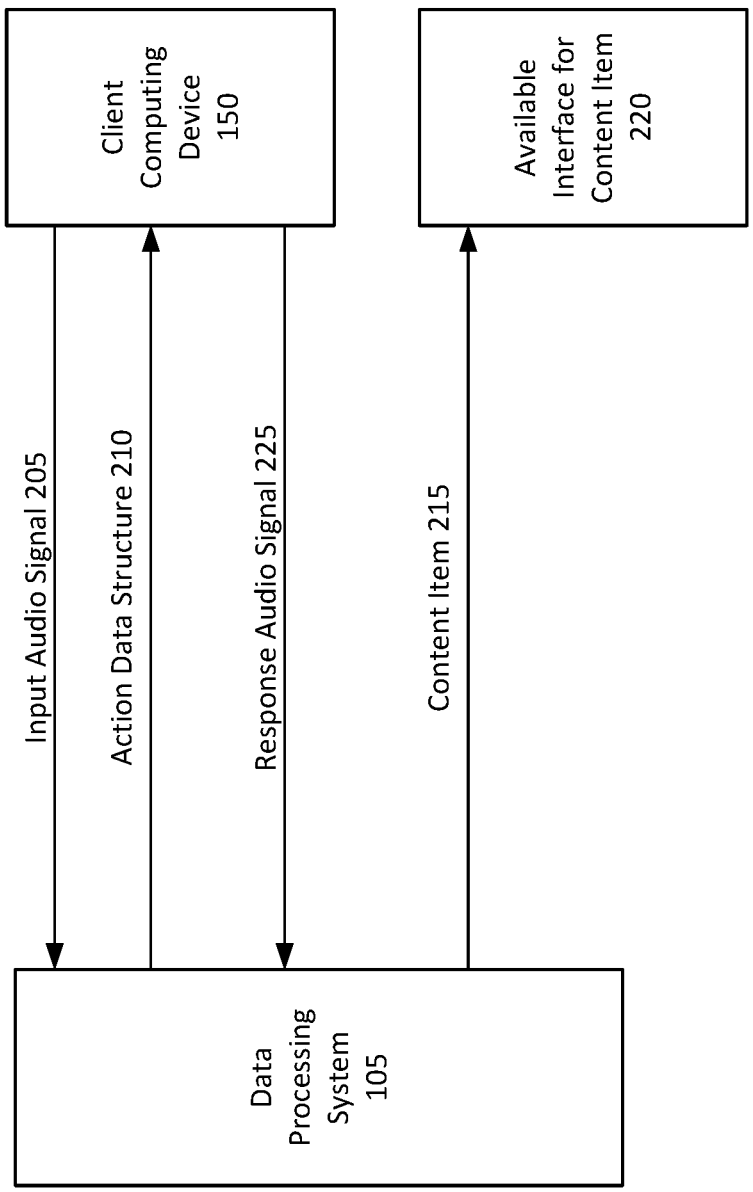
FIG. 2 depicts a flow diagram for multi-modal transmission of packetized data in a voice activated computer network environment.

FIG. 2 depicts a flow diagram 200 for multi-modal transmission of packetized data in a voice activated computer network environment. The data processing system 105 can receive the input audio signal 205, e.g., "OK, I would like to go to the beach this weekend." In response, the data processing system generates at least one action data structure 210 and at least one content item 215. The action data structure 205 can include organic or non-sponsored content, such as a response for audio rendering stating "It will be sunny and 80 degrees at the beach this weekend" or "high tide is at 3 pm." The data processing system 105 can provide the action data structure 210 to the same client computing device 150 that originated the input audio signal 205, for rendering by a candidate interface of the client computing device 150, e.g., as output in a real time or conversational manner as part of a digital or conversational assistant platform.

The data processing system 105 can select the candidate interface 220 as a selected interface for the content item 215, and can provide the content item 215 to the selected interface 220. The content item 215 can also include a data structure, converted to the appropriate modality by the data processing system 105 for rendering by the selected interface 220. The content item 215 can include sponsored content, such as an offer to rent a beach chair for the day, or for sunscreen. The selected interface 220 can be part of or executed by the same client computing device 150 or by a different device accessible by the end user of the client computing device 150. Transmission of the action data structure 210 and the content item 215 can occur at the same time or subsequent to one another. The action data structure 210 can include an indicator that the content item 215 is being or will be transmitted separately via a different modality or format to the selected interface 200, alerting the end user to the existence of the content item 215.

The action data structure 210 and the content item 215 can be provided separately for rendering to the end user. By separating the sponsored content (content item 215) from the organic response (action data structure 210) audio or other alerts indicating that the content item 215 is sponsored do not need to be provided with the action data structure 210. This can reduce bandwidth requirements associated with transmission of the action data structure 210 via the network 165 and can simplify rendering of the action data structure 210, for example without audio disclaimer or warning messages.

The data processing system 105 can receive a response audio signal 225. The response audio signal 225 can include an audio signal such as, "great, please book me a hotel on the beach this weekend." Receipt by the data processing system 105 of the response audio signal 225 can cause the data processing system to invoke the direct action API 135 to execute a conversion to, for example, book a hotel room on the beach. The direct action API 135 can also communicate with at least one service provider computing device 160 to provide information to the service provider computing device 160 so that the service provider computing device 160 can complete or confirm the booking process.

Figure 3:
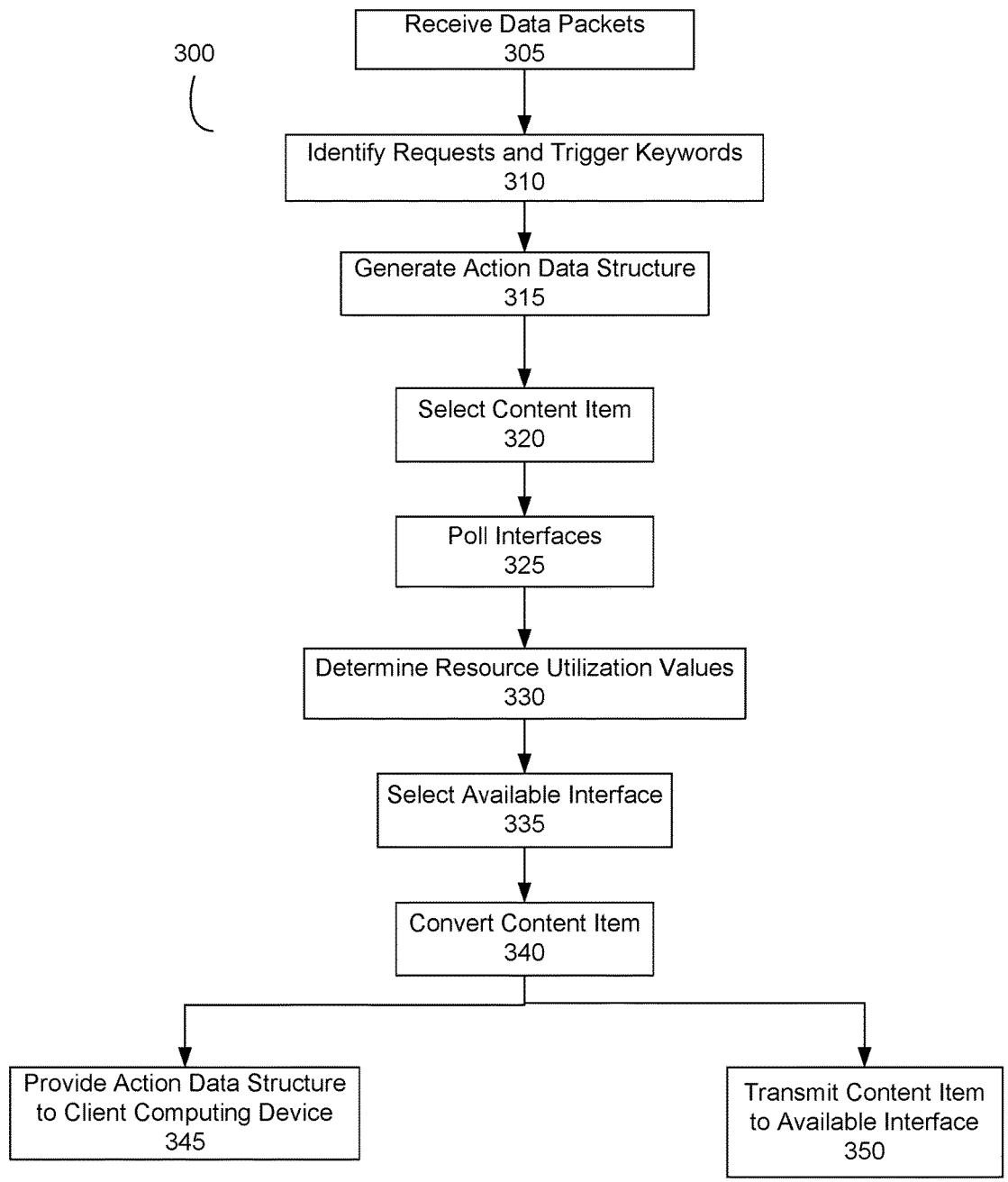
FIG. 3 depicts method of multi-modal transmission of packetized data in a voice activated computer network environment.

FIG. 3 depicts a method 300 of multi-modal transmission of packetized data in a voice activated computer network environment. The method 300 can receive data packets (ACT 305). For example, the NLP component 110, executed by the data processing system 105, can receive from the client computing device 105 data packets that include an input audio signal (ACT 305). The data packets can be received (ACT 305) via the network 165 as packet or other protocol based data transmissions. The method 300 can identify, from the input audio signal, requests or trigger keywords corresponding to the requests (ACT 310). For example, the NLP component 110 can parse the input audio signal to identify requests that relate to subject matter of the input audio signal, or to identify trigger keywords that can indicate, for example, actions associated with the requests.

The method 300 can generate at least one action data structure (ACT 315). For example, the direct action API 135 can generate action data structures (ACT 315) based on the requests or trigger keywords. The action data structures can indicate organic or non-sponsored content related to the input audio signal. The method 300 can select at least one content item (ACT 320). For example, the content selector component 125 can receive the request(s) or the trigger keyword(s) and based on this information can select one or more content items. The content items can include sponsored items having subject matter that relates to subject matter of the request or of the trigger keyword. The content items can be selected by the content selector component 125 via a real-time content selection process.

The method 300 can poll a plurality of interfaces to determine at least one candidate interface (ACT 325). The candidate interfaces can include candidate interfaces for rendering of the selected content item (or action data structure). For example, the interface management component 140 can query interfaces to obtain utilization values, e.g., parameter information or other characteristics about the interfaces (ACT 330). Based on the utilization values the interface management component 140 can select (ACT 335) at least one candidate interface as a selected interface for rendering of the content item (or of the action data structure). The method 300 can include converting the content item to a modality for rendering via the selected interface (ACT 340). For example the data processing system 105 or component thereof such as the interface management component 140 can convert the content item for rendering in a content item slot of an online document (e.g., for display as an email (e.g., via a selected email interface) or as a text message for display in a chat app).

The method 300 can provide the action data structure to the client computing device 150 for rendering (ACT 345) and can transmit the content item to the candidate interface selected for rendering of the content item (ACT 350). For example, via the interface 115 the interface management component 140 can provide the action data structure to the client computing device 150 for rendering as audio output responsive to the input audio signal (ACT 345). The data processing system can also transmit the content item to the selected interface on the same or a different client computing device 150 for rendering in the converted modality (ACT 350).

Figure 4:
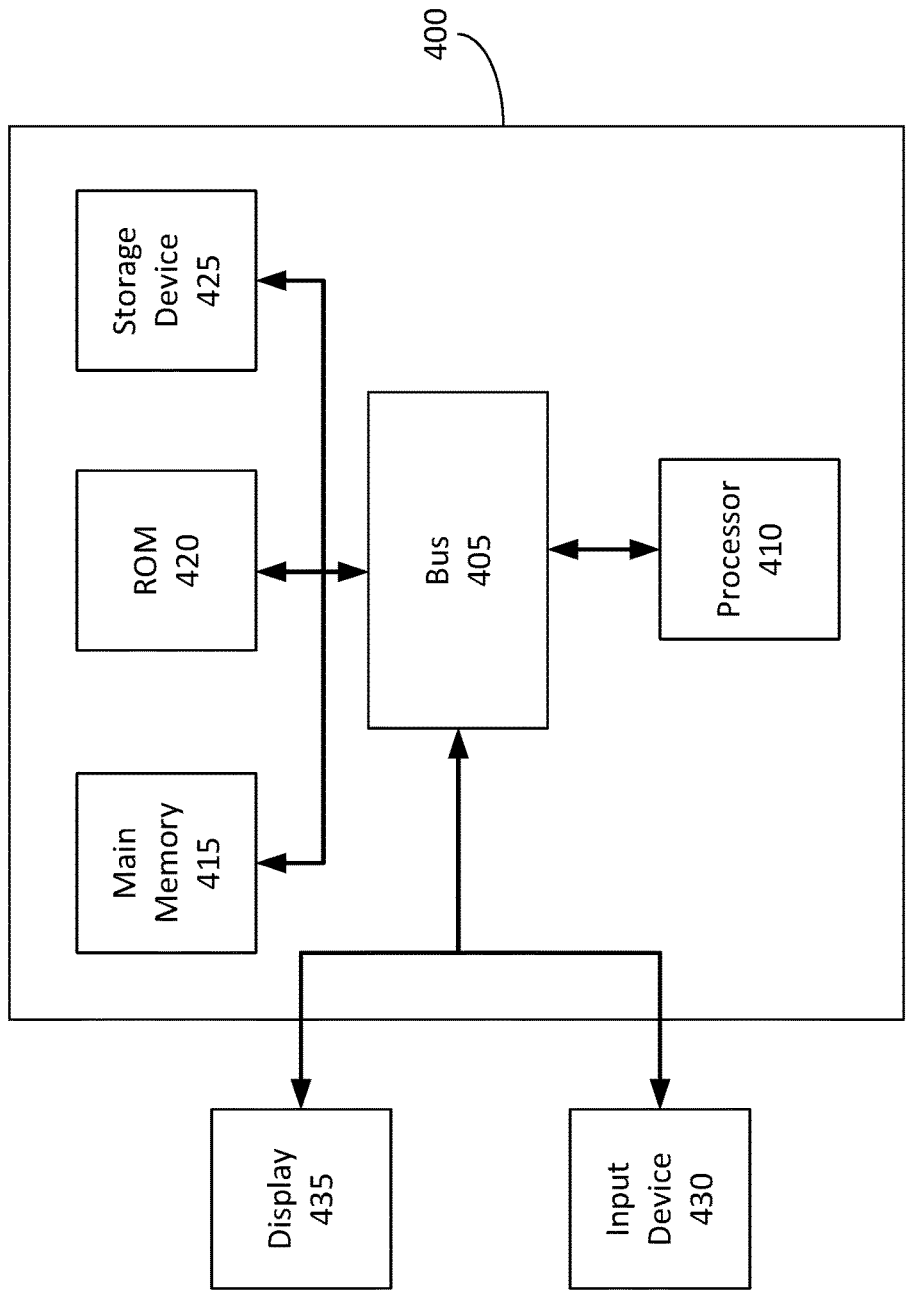
FIG. 4 is a block diagram illustrating a general architecture for a computer system that may be employed to implement elements of the systems and methods described and illustrated herein.

FIG. 4 is a block diagram of an example computer system 400. The computer system or computing device 400 can include or be used to implement the system 100, or its components such as the data processing system 105. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 105, the client computing device 150 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The interface management component 140, direct action API 135, content selector component 125, prediction component 120 or NLP component 110 and other data processing system 105 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 105) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing action data structures or content items) to a client device (e.g., to the client computing device 150 for purposes of displaying data to and receiving user input from a user interacting with the client device, or to the service provider computing device 160 or the content provider computing device 155). Data generated at the client device (e.g., a result of the user interaction) can be received from the client device at the server (e.g., received by the data processing system 105 from the computing device 150 or the content provider computing device 155 or the service provider computing device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 110, the content selector component 125, the interface management component 140, or the prediction component 120 can be a single component, app, or program, or a logic device having one or more processing circuits, or part of one or more servers of the data processing system 105.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system of multi-modal transmission of packetized data in a voice activated data packet based computer network environment, comprising:
    a natural language processor component executed by a data processing system to receive, via an interface of the data processing system, data packets comprising an input audio signal detected by a sensor of a client computing device;
    the natural language processor component to parse the input audio signal to identify a request and a trigger keyword corresponding to the request;
    a direct action application programming interface of the data processing system to generate, based on at least one of the request and the trigger keyword, a first action data structure;
    a content selector component executed by the data processing system to receive at least one of the request and the trigger keyword identified by the natural language processor and to select, based on at least one of the request and the trigger keyword, a content item via a real-time content selection process;
    an interface management component of the data processing system to:
        poll a plurality of interfaces to identify a first candidate interface and a second candidate interface;
        determine a first resource utilization value for the first candidate interface and a second resource utilization value for the second candidate interface, the first resource utilization value and the second resource utilization value based on at least one of a battery status, processor utilization, memory utilization, an interface parameter, and network bandwidth utilization;
        select, based on a comparison of the first resource utilization value and the second resource utilization value, the first candidate interface as a selected interface to present the content item;
        convert the content item for delivery in a modality compatible with the selected interface selected based on the comparison of the first resource utilization value and the second resource utilization value;
        provide the first action data structure to the client computing device for rendering as audio output from the client computing device; and
        transmit the content item converted for the first modality to deliver the content item for rendering from the selected interface.

2. The system of claim 1, comprising:
    the interface management component to deliver the content item to the client computing device via the selected interface subsequent to transmission of the data structure to the client computing device.

3. The system of claim 1, wherein first candidate interface and second candidate interface are two different interfaces of the client device.

4. The system of claim 3, comprising:
    the interface management component to provide the first action data structure for rendering from the second candidate interface.

5. The system of claim 1, wherein the client computing device is a first client computing device, comprising:
    the interface management component to determine that the first candidate interface corresponds to the first client computing device linked to an account, and that the second candidate interface corresponds to a second client computing device linked to the account.

6. The system of claim 1, comprising the interface management component to:
    determine that the first candidate interface corresponds to an account, and that the second candidate interface corresponds to the account; and to
    transmit a second content item via the second candidate interface based on the first candidate interface and the second candidate interface corresponding to the account.

7. The system of claim 6, wherein the client computing device is a first client computing device, comprising:
    the interface management component to determine that the first candidate interface corresponds to the first client computing device and that the second candidate interface corresponds to a second client computing device.

8. The system of claim 1, wherein the first candidate interface includes a display screen, and the second candidate interface includes an audio interface.

9. The system of claim 1, wherein the first candidate interface is associated with a push notification, and the second candidate interface includes a java script slot on an online document.

10. The system of claim 1, comprising the interface management component to:
    identify a third candidate interface;
    determine a third resource utilization value for the third candidate interface; and
    assign a hierarchy to the first candidate interface, the second candidate interface, and the third candidate interface based on the first resource utilization value, the second resource utilization value, and the third resource utilization value.

11. The system of claim 10, comprising:
    the interface management component to deliver the content item to the client computing device via the selected interface based on the hierarchy.

12. The system of claim 1, comprising the interface management component to:
    determine that the first resource utilization value indicates one of a charging status and a connection to an external power source; and
    select the first candidate interface as the selected interface based on the first resource utilization value that indicates one of the charging status and the connection to the external power source.

13. The system of claim 1, wherein the plurality of candidate interfaces include at least one of a display screen, an audio interface, a vibration interface, an email interface, a push notification interface, a mobile computing device interface, a portable computing device application, a content slot on an online document, a chat application, mobile computing device application, a laptop, a watch, a virtual reality headset, and a speaker.

14. The system of claim 1, wherein the client computing device is a first client computing device, comprising the interface management component to:
    determine a distance between the first client computing device and a second client computing device; and to
    transmit the content item converted for the first modality to the second client computing device.

15. The system of claim 1, wherein the client computing device is a first client computing device, comprising the interface management component to:
    transmit the content item converted for the first modality to the first client computing device within a pre-determined time period from receipt of the input audio signal by the natural language processor component.

16. The system of claim 1, comprising:
    the interface management component to determine, from the second resource utilization value, that the second candidate interface is unavailable.

17. The system of claim 1, comprising:
    provide the first action data structure to the client computing device for rendering with an indication of the content item, the indication identifying the first candidate interface.

18. A method of multi-modal transmission of packetized data in a voice activated data packet based computer network environment, comprising:
    receiving, by a natural language processor component executed by a data processing system, via an interface of the data processing system, data packets comprising an input audio signal detected by a sensor of a client computing device;
    identifying, by the natural language processor component, from the input audio signal, a request and a trigger keyword corresponding to the request;
    generating, by a direct action application programming interface of the data processing system, based on at least one of and the trigger keyword, a first action data structure;
    receiving, by a content selector component executed by the data processing system, at least one of the request and the trigger keyword identified by the natural language processor and selecting, based on at least one of the request and the trigger keyword, a content item via a real-time content selection process;
    polling, by an interface management component of the data processing system, a plurality of interfaces to identify a first candidate interface and a second candidate interface;
    determining, by the interface management component, a first resource utilization value for the first candidate interface and a second resource utilization value for the second candidate interface, the first resource utilization value and the second resource utilization value based on at least one of a battery status, processor utilization, memory utilization, an interface parameter, and network bandwidth utilization;
    selecting, based on a comparison of the first resource utilization value and the second resource utilization value, the first candidate interface as a selected interface to present the content item;
    converting the content item for delivery in a modality compatible with the first candidate interface selected based on the comparison of the first resource utilization value and the second resource utilization value;
    providing the first action data structure to the client computing device for rendering as audio output from the client computing device; and
    transmitting the content item converted for the first modality to deliver the content item for rendering from the selected interface.

19. The method of claim 18, wherein first candidate interface and second candidate interface are two different interfaces of the client device, comprising:
    providing the first action data structure for rendering from the second candidate interface.

20. The method of claim 18, wherein the client computing device is a first client computing device, comprising:
    transmitting the content item converted for the first modality to the first client computing device within a pre-determined time period from receipt of the input audio signal by the natural language processor component.

* * * * *